Patented Feb. 27, 1934

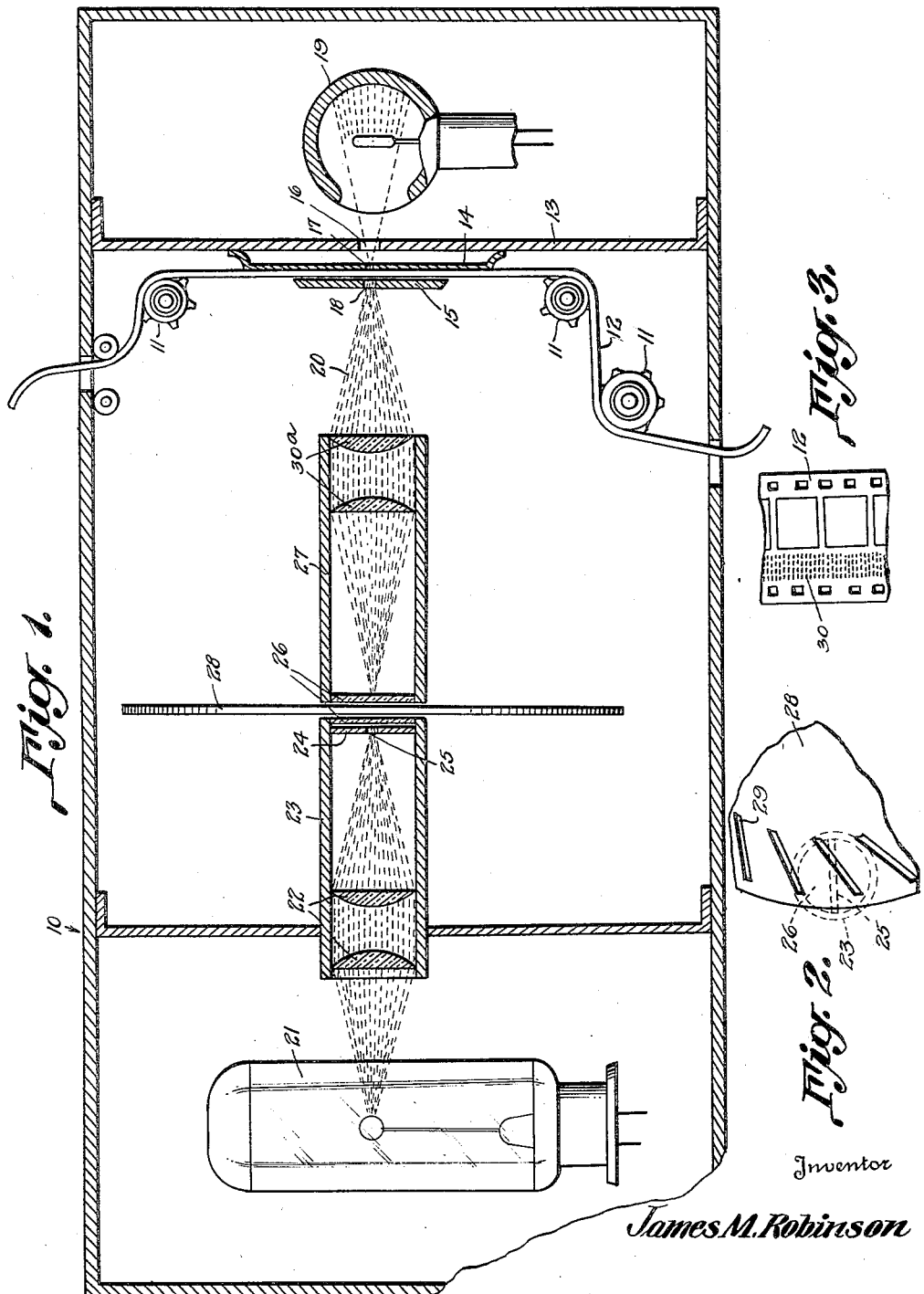

1,949,184

UNITED STATES PATENT OFFICE 1,949,184

SOUND REPRODUCING DEVICE

James Michael Robinson, Evansville, Ind.

Application April 6, 1932. Serial No. 603,622

2 Claims. (Cl. 274—5)

This invention relates to a sound reproducing device and has for an object to provide an improved sound reproducing device used for reproducing sound which has been recorded horizontally or laterally on a sensitive film such as used in motion pictures or electrical transcription for radio purposes or any other purposes. A film having a substantially horizontal or lateral sound track has been shown in an application Ser. No. 603,621, filed April 6, 1932, by this same inventor and entitled "Sound recording film," while a device for producing this sound film having a horizontal track or lateral track has been shown in an application Ser. No. 603,623, filed April 6, 1932, by this same inventor and entitled "Sound recording device."

This invention is purely adapted for reproducing laterally spaced sound tracks on a vertically moving film. It is a further object of this invention to provide a means for causing a beam of light to move horizontally or laterally across the sound track on the sound film, which beam of light then passes through a photo-electric cell to cause electrical variations which will in turn reproduce the original sound that has been recorded.

With the foregoing and other objects in view, as will hereinafter become apparent, this invention comprises the constructions, combinations, and arrangements of parts, hereinafter set forth, disclosing and shown on the accompanying drawing. In this drawing, Figure 1 is a sectional view taken through the reproducing device showing the relative positions of the units in the apparatus, Figure 2 is a fragmentary view of the scanning disk, and Figure 3 is a fragmentary view of the film showing sound variations thereon.

There is shown at 10 an enclosing supporting means of this sound reproducing device. This support 10 has a series of gears 11 for feeding the sound film 12, which may or may not be also a moving picture film, therethrough, a vertical support 13 having a spring 14 for pressing the moving film 12 against a support 15 for holding the same in a proper position to allow the reproducing light rays to pass therethrough at the proper focal point. The support 13, the spring 14, and the support 15 each have suitably placed apertures 16, 17 and 18, permitting the light rays to pass therethrough and through the film 12 to the photo-electric cells 19, which in turn provide corresponding varying electrical impulses to operate a sound producing device, which may be a loud speaker or any other suitable device.

The light rays 20, which have been just focused on the photo-electric cell 19 through the film 12 are originally produced by the exciter lamp 21, whence they go to a pair of lenses 22 in a lense barrel 23. Lenses 22 focus the light rays on a horizontal slot 25 in an opaque member 24. This horizontal slot 25 will be very narrow, it having been found in practice that a slot of the width of .015 inches is most suitable. The end of the lense barrel 23 and of the adjacent lense barrel 27 is closed off by a suitable glass disk 26 to prevent dust from geting therein. Passing between the lense barrels 23 and 27 is a scanning disk 28, the scanning disk 28 having a series of circumferentially placed angular parallelogram-shaped apertures 29 so spaced that any radius will always intersect at least one aperture 29. Each aperture 29 passes successively across the horizontal slot 25, as shown in Figure 2, and thus permit the beam of light to pass in a horizontal path therethrough into the lense barrel 27. The horizontal beam of light then passes through the lenses 30a in the lense barrel 27 where it is focused through the aperture 18 in the support 15 on through the horizontal sound track 30 on the film 12, the film 12 passing by means of the gearing 11 in proper synchronism with the speed of the scanning disk 28. In this manner, each horizontal sound track 30 will cooperate with one of the angular apertures 29 in the scanning disk, the successive angular apertures 29 taking care of the successive horizontal sound tracks.

When the beam of light 20 is passing through the sound track 30, it will be varied directly in accordance with the variations in the sound track, thus permitting a varied beam of light to strike the photo-electric cell 19, whereby the sounds reproduced will be directed in accordance with the sounds that have been originally recorded.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A sound reproducing device comprising a source of light, a light sensitive cell, and a sound record film interposed between the source of light and the light sensitive cell, said sound record film having a series of lateral sound tracks thereon at right angles to the direction of movement thereof, means for causing a beam of light from said source of light to travel along said sound track, said means including a stationary opaque member having a slot therein at right angles to the direction of travel of the film, and a rotatable scanning disk having a series of circumferentially spaced slots therein placed at an angle to a radius of the disk passing through the slot, whereby each angularly placed slot will pass across said slot to provide a track or beam of light passing therethrough.

2. A sound reproducing device comprising a source of light, a light sensitive cell, a sound record film interposed between the source of light and the light sensitive cell, said sound record film having a series of lateral sound tracks thereon at right angles to the direction of movement thereof, means for causing a beam of light from said source of light to travel along said sound track, said means including a stationary opaque member having a slot therein at right angles to the direction of travel of the film, and a rotatable scanning disk having a series of circumferentially spaced slots therein placed at an angle to a radius of the disk passing through the slot, whereby each angularly placed slot will pass across said slot to provide a track or beam of light passing therethrough, each successive angular slot providing a successive path of light.

JAMES MICHAEL ROBINSON.